(12) United States Patent
Kim et al.

(10) Patent No.: US 12,507,124 B2
(45) Date of Patent: Dec. 23, 2025

(54) METHOD AND APPARATUS FOR DETERMINING INTERFERENCE BETWEEN HETEROGENEOUS SERVICES

(71) Applicant: ELECTRONICS AND TELECOMMUNICATIONS RESEARCH INSTITUTE, Daejeon (KR)

(72) Inventors: Jun Seok Kim, Daejeon (KR); Young Jun Chong, Daejeon (KR); Sung Woong Choi, Daejeon (KR); Heon Jin Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 402 days.

(21) Appl. No.: 18/080,985

(22) Filed: Dec. 14, 2022

(65) Prior Publication Data

US 2023/0397049 A1 Dec. 7, 2023

(30) Foreign Application Priority Data

Jun. 7, 2022 (KR) .................. 10-2022-0068702

(51) Int. Cl.
*H04W 28/16* (2009.01)
*H04B 17/345* (2015.01)
*H04L 43/0829* (2022.01)

(52) U.S. Cl.
CPC .......... *H04W 28/16* (2013.01); *H04B 17/345* (2015.01); *H04L 43/0829* (2013.01)

(58) Field of Classification Search
CPC ..... H04W 28/16; H04W 24/08; H04W 24/02; H04W 16/18; H04W 24/06; H04B 17/345; H04B 17/318; H04L 43/0829; H04L 41/14; H04L 43/20; H04L 43/022
See application file for complete search history.

(56) References Cited

U.S. PATENT DOCUMENTS

| | | | |
|---|---|---|---|
| 6,459,903 B1 | 10/2002 | Lee | |
| 6,957,072 B2 | 10/2005 | Kangras et al. | |
| 7,057,557 B2 | 6/2006 | Lee | |
| 9,386,542 B2 | 7/2016 | Russell et al. | |
| 2011/0086652 A1 | 4/2011 | So et al. | |
| 2016/0218796 A1 | 7/2016 | Ryu | |
| 2019/0369204 A1 | 12/2019 | Kim et al. | |
| 2020/0128552 A1 | 4/2020 | Son et al. | |
| 2022/0090918 A1 | 3/2022 | Forstall et al. | |
| 2022/0299591 A1* | 9/2022 | Ainapure | G01S 5/02213 |

FOREIGN PATENT DOCUMENTS

| | | |
|---|---|---|
| KR | 100497894 B1 | 6/2005 |
| KR | 1020090031064 A | 3/2009 |
| KR | 20100123550 A | 11/2010 |
| KR | 20110038782 A | 4/2011 |
| KR | 20140042347 A | 4/2014 |
| KR | 20180112969 A | 10/2018 |
| KR | 102135766 B1 | 7/2020 |

* cited by examiner

*Primary Examiner* — Eric Myers
(74) *Attorney, Agent, or Firm* — Rabin & Berdo, P.C.

(57) ABSTRACT

An operating method of a receiving device of a communication system may comprise: receiving an identical signal from an identical transmitting device; receiving interference signals from heterogeneous transmitting devices installed at sample installation points in a base station installation target area; and setting an acceptable interference level on the basis of received signal strength indicators (RSSIs) of the interference signals.

13 Claims, 12 Drawing Sheets

METHOD AND APPARATUS FOR DETERMINING INTERFERENCE BETWEEN HETEROGENEOUS SERVICES

CROSS-REFERENCE TO RELATED APPLICATIONS

This application claims priority to Korean Patent Application No. 10-2022-0068702, filed on Jun. 7, 2022 with the Korean Intellectual Property Office (KIPO), the entire contents of which are hereby incorporated by reference.

BACKGROUND

1. Technical Field

The present disclosure relates to a technique for determining interference between heterogeneous services, and more particularly, to a technique for determining interference between heterogeneous services to calculate a protection separation distance and a protection area for mutual coexistence between the heterogeneous services.

2. Related Art

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies. For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

A communication system may interfere with a receiving device of a fixed system that uses the same frequency band or an adjacent frequency band. In this case, the receiving device of the fixed system affected by the interference cannot provide a service smoothly. In particular, the receiving device that receives radio waves and outputs a video, e.g., a broadcast, may not be capable of providing a service due to strong interference. Spatial separation between heterogeneous devices may be a most efficient method of preventing the interruption of a smooth service. However, a space may not be efficiently used when heterogeneous devices are spatially separated from each other. Therefore, there may be a need to minimize spatial separation between heterogeneous devices in a communication system.

SUMMARY

To address the above-described problem, the present disclosure is directed to providing a method and apparatus for determining interference between heterogeneous services to calculate a protection separation distance and a protection area for mutual coexistence between the heterogeneous services.

According to a first exemplary embodiment of the present disclosure, an operating method of a receiving device of a communication system may comprise: receiving an identical signal from an identical transmitting device; receiving interference signals from heterogeneous transmitting devices installed at sample installation points in a base station installation target area; and setting an acceptable interference level on the basis of received signal strength indicators (RSSIs) of the interference signals.

The setting of the acceptable interference level on the basis of the RSSIs of the interference signals may comprise: measuring RSSIs of the interference signals; determining a degree of interference with the homogeneous signal affecting on the identical signal; classifying interference signals causing unacceptable interference; and setting the acceptable interference level on the basis of the RSSIs of the interference signals causing unacceptable interference.

The determining of the degree of interference with the homogeneous signal affecting on the identical signal may comprise: calculating a packet loss rate of the same signal affected by each of the interference signals; when the packet loss rate is less than a reference level, determining that an interference signal with the packet loss rate less than the reference level is an acceptable interference signal; and when the packet loss rate is greater than or equal to the reference level, determining that an interference signal with the packet loss rate greater than or equal to the reference level is an unacceptable interference signal.

The setting of the acceptable interference level on the basis of the RSSIs of the interference signals causing unacceptable interference may comprise: detecting a minimum RSSI among the RSSIs of the interference signals causing unacceptable interference; and setting the detected minimum RSSI as the acceptable interference level.

The setting of the acceptable interference level on the basis of the RSSIs of the interference signals causing unacceptable interference may comprise: producing a histogram representing the number of heterogeneous transmitting devices for each section of the RSSIs of the interference signals; calculating ratios between the number of the heterogeneous transmitting devices causing unacceptable interference and the number of the heterogeneous transmitting devices causing acceptable interference in the sections; and setting, as the acceptable interference level, a median of a section with a minimum ratio among sections with ratios greater than or equal to a certain level.

The operating method may further comprise: installing a virtual receiving device and virtual heterogeneous transmitting devices on virtual installation points on a map of a geographic information system; simulating the virtual receiving device to receive virtual interference signals from the virtual heterogeneous transmitting devices; and setting a protection separation distance on the basis of RSSIs of the interference signals.

The installing of the virtual receiving device and the virtual heterogeneous transmitting devices on the map of the geographic information system may comprise: virtually installing the virtual receiving device on the map of the geographic information system; setting the virtual installation points on the map of the geographic information system; and virtually installing the virtual heterogeneous transmitting devices at the virtual installation points.

The setting of the protection separation distance on the basis of the RSSIs of the virtual interference signals may comprise: estimating RSSIs of the virtual interference signals received virtually by the virtual receiving device; classifying virtual interference signal causing unacceptable interference on the basis of the acceptable interference level; and setting a protection separation distance on the basis of the RSSIs of the classified interference signals.

The operating method may further comprise, after the estimating of the RSSIs of the virtual interference signals received virtually by the virtual receiving device: searching for virtual installation points corresponding to the sample installation points; calculating error values between RSSIs of virtual interference signals at the retrieved virtual installation points and RSSIs actually measured at the sample installation points corresponding to the retrieved virtual installation points; and correcting the RSSI of each of the virtual interference signals by reflecting the calculated errors.

The operating method may further comprise setting, as a protection area, a region of an area, which is not within the protection separation distance and in which virtual heterogeneous transmitting devices causing unacceptable interference are clustered, on the basis of the RSSIs of the virtual interference signals.

According to a second exemplary embodiment of the present disclosure, a receiving device may comprise: a processor; the processor being configured to control the receiving device to: receive an identical signal from an identical transmitting device; receive interference signals from heterogeneous transmitting devices installed at sample installation points in a base station installation target area; and set an acceptable interference level on the basis of received signal strength indicators (RSSIs) of the interference signals.

When the acceptable interference level is set on the basis of the RSSIs of the interference signals, the processor may be further configured to control the receiving device to: measure the RSSIs of the interference signals; determine a degree of interference with the homogeneous signal affecting on the identical signal; classify interference signals causing unacceptable interference; and set the acceptable interference level on the basis of the RSSIs of the interference signals causing unacceptable interference.

The processor may be further configured to control the receiving device to: install a virtual receiving device and virtual heterogeneous transmitting devices at virtual installation points on a map of a geographic information system; simulate the virtual receiving device to receive virtual interference signals from the virtual heterogeneous transmitting devices; and set a protection separation distance on the basis of the RSSIs of the interference signals.

According to the present disclosure, a receiving device can receive signals from an identical transmitting device and receive interference signals from heterogeneous transmitting devices installed in areas in which base stations are to be installed and thus can set an acceptable interference criterion for determining an acceptable interference level.

In addition, according to the present disclosure, the receiving device can simulate the transmission of virtual heterogeneous signals from virtual heterogeneous transmitting devices by installing a virtual receiving device and the virtual heterogeneous transmitting devices on a map provided by a GIS.

Accordingly, the receiving device can estimate received signal strengths of the virtual heterogeneous signals received by the virtual receiving device. In addition, the receiving device can set a protection separation distance and a protection area on the basis of the received signal strengths of the virtual heterogeneous signals.

DETAILED DESCRIPTION OF THE EMBODIMENTS

Figure 1:
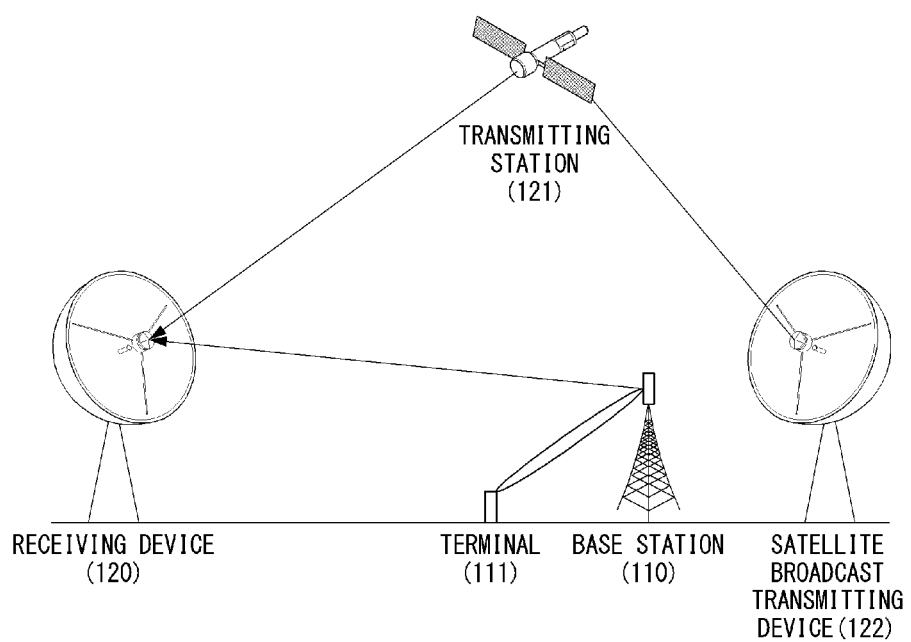
FIG. 1 is a conceptual diagram illustrating a communication system according to a first embodiment.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, beyond 5G (B5G) mobile communication network (e.g., 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a communication system according to a first embodiment.

Referring to FIG. 1, the communication system may include a base station 110, a terminal 111, a receiving device 120, a transmitting station 121, and a satellite broadcast transmitting device 122. Here, the base station 110 and the terminal 111 may form a first wireless communication network. The first wireless communication network is a mobile communication network and may include a communication device of a mobile communication system. Accordingly, the communication device included in the first wireless communication network may perform mobile communication.

The receiving device 120, the transmitting station 121, and the satellite broadcast transmitting device 122 may form a second wireless communication network. The second wireless communication network is a satellite broadcast communication network and may include a communication device of a satellite broadcast communication system. In this case, the receiving device 120 used for satellite broadcasting may be in a fixed state, and the transmitting station 121 may be in a non-fixed state like a satellite.

Here, the satellite broadcast transmitting device 122 may transmit a satellite broadcast signal to the receiving device 120 through the transmitting station 121 by applying satellite broadcast transmission technology. The transmitting station 121 may be mounted in a satellite and receive a satellite broadcast signal transmitted from the satellite broadcast transmitting device 122 and transmit the satellite broadcast signal to the receiving device 120. Accordingly, the receiving device 120 may receive the satellite broadcast signal from the transmitting station 121.

The receiving device 120 may provide a satellite broadcasting service to a receiver according to the received satellite broadcast signal. Here, the satellite broadcast transmitting device 122 may select and transmit an arbitrary signal corresponding to the satellite broadcasting service to secure statistical diversity in determining interference between heterogeneous services by a system for determining interference between heterogeneous services.

In this situation, the first wireless communication network may transmit data to or receive data from the second wireless communication network using the same frequency band or adjacent frequency bands. In this case, the receiving device 120, which is a communication device of the second wireless communication network, may be interfered with by the first wireless communication network.

More specifically, the base station 110 of the first wireless network communication network may track a location of the terminal 111 in real time. In addition, the base station 110 may perform beamforming while reflecting a location of the terminal 111 to transmit or receive data. As described above, a signal transmitted from the base station 110 to the terminal 111 may interfere with the receiving device 120. Accordingly, the base station 110 may be disposed to reduce interference with the receiving device 120.

According to an embodiment, the receiving device 120, which is a communication device of the second wireless communication network, is arranged at a fixed position. In contrast, the base station 110, which is a communication device of the first wireless communication network, may be arranged near the receiving device 120. Accordingly, the receiving device 120 may evaluate interference according to the arrangement of the base station 110. For example, the receiving device 120 may evaluate an influence of a received signal, which is to be received from the base station 110, on a received signal received from the transmitting station 121 in advance to evaluate interference to be caused by the base station 110. In this case, when the quality of the received signal received from the transmitting station 121 is less than or equal to an acceptable interference level, the receiving device 120 may determine that acceptable interference has occurred. Here, the acceptable interference level may be, for example, a packet loss rate of 10% or more in the case of a broadcast signal. Thus, when a packet loss rate of the received signal received from the transmitting station 121 is 10% or less, the receiving device 120 may determine that acceptable interference has occurred.

The base station 110 may be arranged an appropriate distance from the receiving device 120 to cause acceptable interference to the receiving device 120, based on the evaluation of interference. Here, the first wireless communication network is a mobile communication network but is not limited thereto, and may be a broadcast network as necessary. The second wireless communication network is, for example, a satellite broadcast communication network but is not limited thereto and may be a general broadcast network. The second wireless communication network may be a mobile communication network as necessary. As described above, the first wireless communication network and the second wireless communication network may be different types of communication networks and provide different services (i.e., heterogeneous services).

Meanwhile, base stations that are communication devices of the first wireless communication network may be disposed at various locations around a receiving device. In this case, a base station installation business operator may install all base stations at installation points, evaluate interference caused by each of the base stations using a receiving device, and maintain a base station causing acceptable interference. In contrast, when interference with the receiving device caused by an installed base station is not acceptable, the base station installation business operator may install the base station again at a different location and evaluate interference again.

It will be costly for the base station installation business operator to personally install base stations, evaluate interference, and search for an appropriate installation point while moving to another area when the base stations are not suitable as described above. Therefore, in order to reduce this problem, the base station installation business operator may easily search for an appropriate base station installation point using an interference signal generation device capable of outputting the same signal as a signal output from a base station.

However, it will also be costly when the base station installation business operator performs the above process with respect to various points in an area where base stations are to be installed. Accordingly, the base station installation business operator may set sample installation points in the area where the base stations are to be installed. In addition, the base station installation business operator may install interference signal generation devices at the set sample installation points to evaluate interference with the receiving device caused by interference signals generated by the interference signal generation devices.

Figure 2:
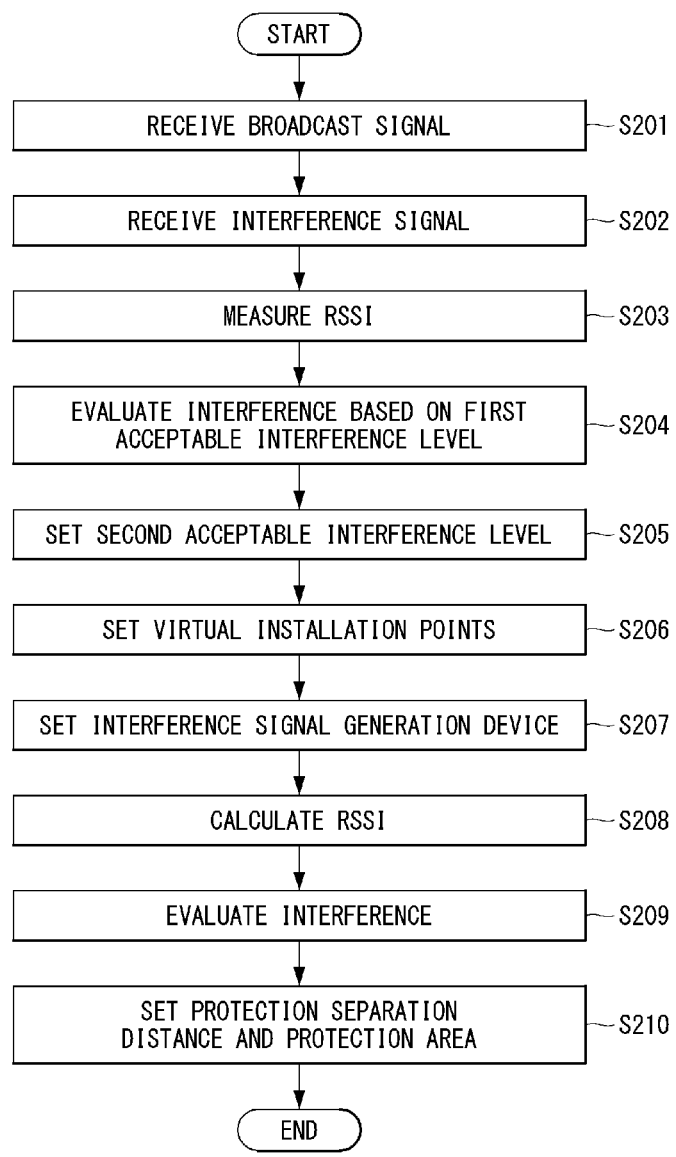
FIG. 2 is a flowchart of a method for determining interference between heterogeneous services according to an embodiment.

FIG. 2 is a flowchart of a method for determining interference between heterogeneous services according to an embodiment.

Referring to FIG. 2, the method of determining interference between heterogeneous services may include a process of setting a second acceptable interference criterion on the basis of a first acceptable interference criterion (S201 to S205) and a process of setting a protection separation distance and a protection area using a geographic information system (GIS) (S206 to S210). In the method of determining interference between heterogeneous services, a transmitting station may transmit a broadcast signal used in a first wireless communication network. Thus, an interference determination device installed in a receiving device may receive the broadcast signal used in the first wireless communication network and transmitted from the transmitting station (S201).

Meanwhile, interference signal generation devices may be installed at sample installation points. The interference signal generation devices may transmit interference signals. Next, the interference determination device installed in the receiving device may receive the interference signals from the interference signal generation devices (S202). In this case, the interference determination device may measure the received signal strength indicators (RSSIs) of received signals received from the interference signal generation devices (S203).

Thereafter, the interference determination device may evaluate an influence of interference signals received from the interference signal generation devices on a received signal received from a transmitting station to evaluate interference to be caused by the interference signal generation devices (S204). In this case, when a degree of interference with the received signal received from the transmitting station is less than or equal to a first acceptable interference level, the interference determination device may determine that a received signal received from a corresponding interference signal generation device is an acceptable interference signal. In contrast, when the degree of interference with the received signal received from the transmitting station is greater than the first acceptable interference level, the interference determination device may determine that the received signal received from the corresponding interference signal generation device is an unacceptable interference signal.

Accordingly, the interference determination device may set a second acceptable interference level, based on RSSIs of received signals received from interference signal generation devices causing acceptable interference and RSSIs of received signals received from interference signal generation devices causing unacceptable interference (S205). In this case, the second acceptable interference level may be one of the RSSIs received from the interference signal generation devices.

Meanwhile, the interference determination device may set several virtual installation points, at which base stations are to be installed on a map provided by a three-dimensional (3D) GIS (S206). Next, the interference determination device may virtually install interference signal generation devices at the virtual installation points (S207). The interference determination device may calculate RSSIs of received signals to be received from the interference signal generation devices installed at the virtual installation points using a radio wave propagation algorithm (S208). Next, the interference determination device may evaluate interference with a receiving device, caused by interference signals generated by the interference determination devices, on the basis of the calculated RSSIs of the interference determination devices (S209).

For example, when a calculated RSSI is less than or equal to the second acceptable interference level, the interference determination device may determine that an interference signal generated from a corresponding interference signal generation device is an acceptable interference signal. In contrast, when the calculated RSSI is greater than the second acceptable interference level, the interference determination device may determine that the interference signal generated from the corresponding interference signal generation device is an unacceptable interference signal.

In this case, the interference determination device may set a protection separation distance and a protection area on the basis of location information of virtual installation points at which interference signal generation devices determined as causing acceptable interference are installed and location information of virtual installation points at which interference signal generation devices determined as causing unacceptable interference are installed (S210).

Figure 3:
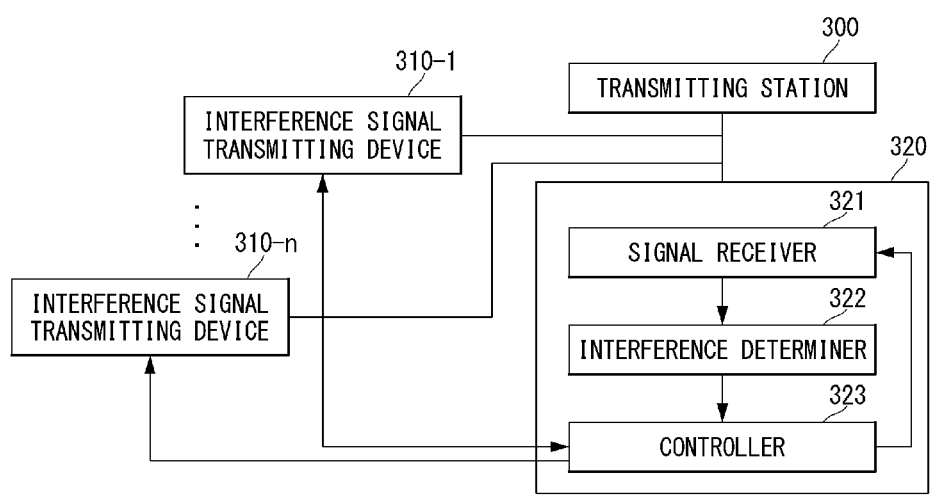
FIG. 3 is a conceptual diagram illustrating a system for determining interference between heterogeneous services according to an embodiment.

FIG. 3 is a conceptual diagram illustrating a system for determining interference between heterogeneous services according to an embodiment.

Referring to FIG. 3, the system for determining interference between heterogeneous services may include a transmitting station 300, interference signal transmitting devices 310-1 to 310-$n$, and an interference determination device 320. The interference determination device 320 may include a signal receiver 321, an interference determiner 322, and a controller 323.

Here, the controller 323 may set sample installation points at which base stations are to be installed, and may transmit location information of the set sample installation points to the interference signal transmitting devices 310-1 to 310-$n$. In this case, the controller 323 may select sample installation points in various ways to secure statistical parameters by reflecting various channel environments. For example, the controller 323 may set the sample installation points in a radial direction. Each of the interference signal transmitting devices 310-1 to 310-$n$ may receive location information of the sample installation point corresponding thereto from the controller 323. The interference signal transmitting devices 310-1 to 310-$n$ may check current locations thereof using a global positioning system (GPS) receiver and move to the sample installation points corresponding thereto, the location information of which is received from the controller 323.

Meanwhile, the controller 323 may set point-specific antenna heights and point-specific orientations with respect to the sample installation points. In addition, the controller 323 may transmit point-specific antenna height information and point-specific antenna orientation information, which are set for corresponding interference signal generation points, to the interference signal transmitting devices 310-1 to 310-$n$. Thereafter, each of the interference signal transmitting devices 310-1 to 310-$n$ may receive the point-specific antenna height information and the point-specific antenna orientation information for the corresponding sample installation point from the controller 323. In this case, the controller 323 may set an antenna height, for example, to 3 m or 9 m.

In addition, the control unit 223 may set point-specific antenna types, gains for the point-specific antenna types, and an effective isotropically radiated power (EIRP) for each of the point-specific antenna types with respect to each of the sample installation points. In this case, the controller 323 may set, for example, an omni-directional antenna or a directional antenna as an antenna type. For example, the controller 323 may set 6 dBi for the omni-directional antenna and 19.5 dBi for the directional antenna as gains for the point-specific antenna types with respect to the sample installation points. The controller 323 may set 44.5 dBm/100 MHz for the omni-directional antenna and 58 dBm/100 MHz for the directional antenna as EIRPs for the point-specific antenna types with respect to the sample installation points.

In addition, the controller 323 may set point-specific transmission times, for the sample installation points, at which an interference signal is to be measured. In this case, the controller 323 may set the point-specific transmission time, for each of the sample installation points, to a plurality of time sections. The controller 323 may transmit point-specific transmission time information about the set point-specific transmission times to the interference signal transmitting devices 310-1 to 310-$n$. The interference signal transmitting devices 310-1 to 310-$n$ may receive the point-specific transmission time information for each of the sample installation points, at which an interference signal is to be measured, from the controller 323.

In addition, the controller 323 may set interference signal characteristics with respect to the sample installation points. In this case, the controller 323 may set the interference signal characteristics to be converted into various types of data and transmit the various types of data for each test. In addition, the controller 323 may select arbitrary signals corresponding to services as interference signals to secure statistical diversity. For example, the interference signal may be a mobile communication interference signal. For example, the mobile communication interference signal may be a 5G or 6G mobile communication interference signal. Here, the interference signal characteristics may include at least one of transmission data, transmission frequency, and transmission power. The controller 323 may transmit information about the set interference signal characteristics for each of the sample installation points to the interference signal transmitting devices 310-1 to 310-$n$. The interference signal transmitting devices 310-1 to 310-$n$ may receive the information about the interference signal characteristics for each of the sample installation points from the controller 323.

The controller 323 may transmit location information of the interference determination device 320 to the interference signal transmitting devices 310-1 to 310-$n$. The interference signal transmitting devices 310-1 to 310-$n$ may receive the location information of the interference determination device 320 from the controller 323. The controller 323 may transmit center frequency information of a satellite channel for which it is desired to measure whether or not interference occurs to the interference signal transmitting devices 310-1 to 310-$n$. The interference signal transmitting devices 310-1 to 310-$n$ may receive the center frequency information about the satellite channel for which it is desired to measure whether or not interference occurs from the controller 323.

Accordingly, each of the interference signal transmitting devices 310-1 to 310-$n$ may generate a mobile communication interference signal corresponding to the center frequency information of the satellite channel, which is received from the controller 323, at the corresponding sample installation point and at the point-specific transmission time according to the point-specific transmission time information, and transmit the mobile controller interference signal toward the signal receiver 321. In this case, each of the interference signal transmitting devices 310-1 to 310-*n* may transmit the mobile communication interference signal at the corresponding sample installation point at the antenna height according to the point-specific antenna height information and in the directional direction according to the point-specific directional information. In addition, each of the interference signal transmitting devices 310-1 to 310-*n* may select a point-specific antenna type at the corresponding sample installation point on the basis of the point-specific antenna type information, and transmit an EIRP for the point-specific antenna type according to the EIRP information for the point-specific antenna type, based on a gain of the point-specific antenna type according to the gain information of the point-specific antenna type.

In this case, each of the interference signal transmitting devices 310-1 to 310-*n* may provide the controller 323 with at least one of an identifier thereof, location information (e.g., GPS coordinate information), the height of an antenna in use, the orientation of the antenna, antenna type of the antenna, an antenna gain of the antenna, an EIRP of the antenna, and a transmission time period.

Here, the system for determining interference between heterogeneous services includes the interference signal transmitting devices 310-1 to 310-*n*, and the interference signal transmitting devices 310-1 to 310-*n* may transmit an interference signal at the sample installation points corresponding thereto. Alternatively, the system for determining interference between heterogeneous services may include one interference signal transmitting device, and the interference signal transmitting device may be installed in a moving device (e.g., a vehicle) to transmit a mobile communication interference signal toward the signal receiver 321 at the sample installation points while moving around the signal receiver 321.

Meanwhile, a satellite broadcast transmitting device may select and transmit an arbitrary signal corresponding to each service to secure statistical diversity in determining interference between heterogeneous services by the system for determining interference between heterogeneous services. Accordingly, the transmitting station 300 may receive such a satellite broadcast signal transmitted from the satellite broadcast transmitting device and relay the received satellite broadcast signal to the signal receiver 321. The transmitting station 300 may be the same as that of FIG. 2.

Then, the signal receiver 321 may receive the satellite broadcast signal from the transmitting station 300. In this case, the signal receiver 321 may receive a satellite broadcast signal of a corresponding channel according to a center frequency of a satellite channel set by the controller 323. Meanwhile, the signal receiver 321 may receive mobile communication interference signals from the interference signal transmitting devices 310-1 to 310-*n*. In this case, the signal receiver 321 may receive the mobile communication interference signals from the interference signal transmitting devices 310-1 to 310-*n* at appointed point-specific transmission times.

In contrast, the signal receiver 321 may receive the mobile communication interference signals from the interference signal transmitting devices 310-1 to 310-*n* regardless of the appointed point-specific transmission times. As described above, when the signal receiver 321 receives the mobile communication interference signals regardless of the appointed point-specific transmission times, the controller 323 may receive identifier information and information about transmission points and times of the mobile communication interference signals from each of the interference signal transmitting devices 310-1 to 310-*n*. The controller 323 may check transmission points, i.e., sample installation points, of the mobile communication interference signals received by the signal receiver 321 by referring to the identifier information and the information about the transmission points and times of the mobile communication interference signals received from the interference signal transmitting devices 310-1 to 310-*n*.

As described above, the signal receiver 321 may simultaneously receive a satellite broadcast signal and mobile communication interference signals. Thus, the signal receiver 321 may provide the interference determiner 322 with combined signals obtained from a combination of the satellite broadcast signal and the mobile communication interference signals. In this case, the signal receiver 321 may provide the interference determiner 322 with reception time information of the satellite broadcast signal and the mobile communication interference signals. Alternatively, the signal receiver 321 may demodulate only the satellite broadcast signal. The signal receiver 321 may provide only the satellite broadcast signal to the interference determiner 322.

The interference determiner 322 may receive the combined signals obtained from the combination of the satellite broadcast signal and the mobile communication interference signals from the signal receiver 321. In addition, the interference determiner 322 may receive reception time information of the combined signals from the signal receiver 321. Alternatively, the interference determiner 322 may receive only the satellite broadcast signal from the signal receiver 321. Accordingly, the interference determiner 322 may determine whether acceptable interference has occurred on the basis of the combined signals. For example, the interference determiner 322 may determine that acceptable interference has occurred in a case in which a broadcast service is performed normally.

Here, the case in which the broadcast service is performed normally may be a case in which screen distortion or the like has not occurred. In contrast, the interference determiner 322 may determine that unacceptable interference has occurred in a case in which a broadcast service is not performed normally. Here, the case in which the broadcast service is not performed normally may be a case in which screen distortion or the like has occurred.

As another example, the interference determiner 322 may calculate packet loss rates of a broadcast signal on the basis of the combined signals. In addition, the interference determiner 322 may determine that acceptable interference has occurred when a calculated packet loss rate is, for example, 10% or less. In contrast, the interference determiner 322 may determine that unacceptable interference has occurred when the calculated packet loss rate is greater than, for example, 10%. Here, a packet loss rate of 10% may be a first acceptable interference level.

Meanwhile, the interference determiner 322 may measure the RSSI of a broadcast signal before a mobile communication interference signal is received and the RSSI of a combined signal when the mobile communication interference signal is received. The interference determiner 322 may calculate the difference between the RSSI of the broadcast signal and the RSSI of the combined signal. The difference between the RSSI of the broadcast signal and the RSSI of the combined signal may be the same as the RSSI of a mobile communication interference signal. In addition, the interference determiner 322 may provide the controller 323 with an interference determination result and an RSSI with respect to each of the combined signals. In this case, the interference determiner 322 may provide the controller 323 with the reception time information of the combined signals received from the signal receiver 321.

Meanwhile, the controller 323 may receive an interference determination result and the RSSI with respect to each of the combination signals from the interference determiner 322. In this case, the controller 323 may receive the reception time information of the combined signals from the interference determiner 322. Accordingly, the controller 323 may identify sample installation points corresponding to the combined signals by matching point-specific transmission times for the sample installation points, which may be stored and managed, with reception times of the combined signals.

In such a situation, at least one of the interference signal transmitting devices 310-1 to 310-n may be located far away from the interference determination device 320 so as to not interfere with the interference determination device 320. Thus, at least one of the interference signal transmitting devices 310-1 to 310-n may not interfere with the interference determination device 320.

Figure 4:
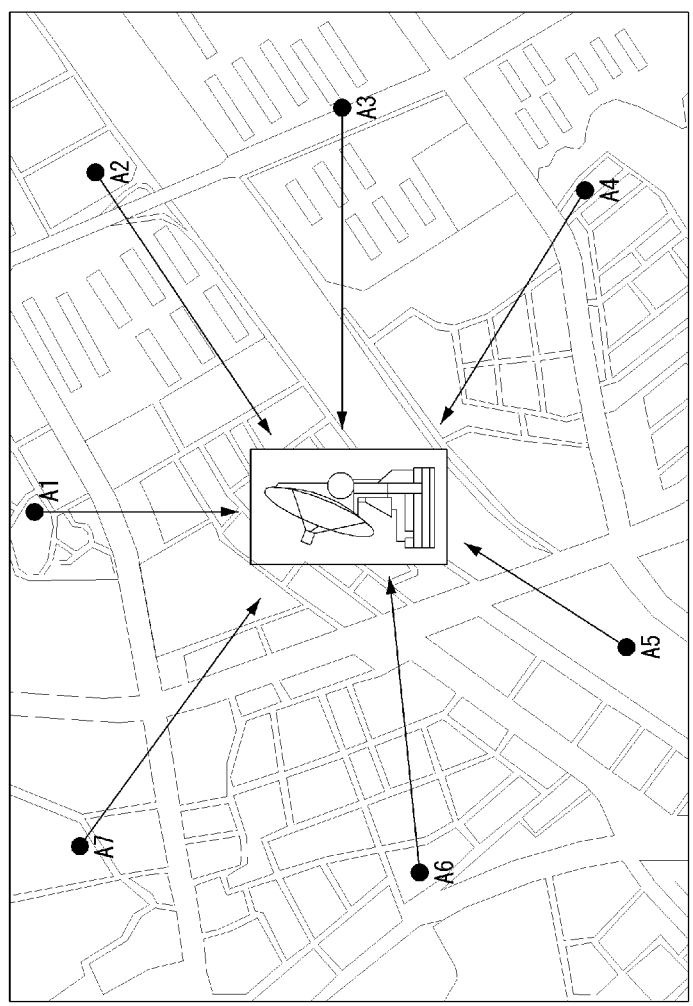
FIG. 4 is a conceptual diagram illustrating a first embodiment of sample installation points configured by an interference determination device.

Accordingly, the number of sample installation points identified by the controller 323 may be less than the number of the interference signal transmitting devices 310-1 to 310-n. In this case, the controller 323 may produce an interference status table as shown below in Table 1. Here, n may be, for example, 7. In this regard, FIG. 4 may be an example of a map on which sample installation points A1 to A7 are displayed when n is 7. The sample installation points A1 to A7 may be scattered around a receiving device R in several directions.

When no interference signal is received from one of the interference signal transmitting devices 310-1 to 310-n, the controller 323 may process that there is no interference with the interference signal transmitting device. In this case, the controller 323 may calculate an RSSI at a boundary point at which interference has occurred, based on RSSIs of interference signals and interference determination results. The controller 323 may set the RSSI at the boundary point to a minimum RSSI, e.g., 25 dBm, as shown in Table 1 below. The RSSI at the boundary point at which interference has occurred may be a second acceptable interference level. Here, the second acceptable interference level may be an RSSI of 25 dBm.

TABLE 1

| Interference signal transmitting device index | Sample installation point | Transmission time | Whether interference signal is received or not | Packet loss rate | RSSI of interference signal | Interference determination |
|---|---|---|---|---|---|---|
| 1 | A1 | AM 10:00 to AM 10:30 | received | 11% | 30 dBm | unacceptable interference occurred |
| 2 | A2 | AM 11:00 to AM 11:30 | received | 10.5% | 35 dBm | unacceptable interference occurred |
| 3 | A3 | PM 1:00 to PM 1:30 | not received | not related | not related | |
| 4 | A4 | PM 2:00 to PM 2:30 | not received | not related | not related | |
| 5 | A5 | PM 3:00 to PM 3:30 | received | 10.1% | 25 dBm | unacceptable interference occurred |
| 6 | A6 | PM 4:00 to PM 4:30 | received | 9.9% | 24 dBm | acceptable interference |
| 7 | A7 | PM 5:00 to PM 5:30 | received | 10.2% | 25.1 dBm | unacceptable interference occurred |

The case in which n is 7 has been described here, but n may be greater than 7. In this case, the controller 323 may draw a histogram using RSSIs received from the interference signal transmitting devices 310-1 to 310-*n*. In this case, a horizontal axis of the histogram may represent an RSSI and a vertical axis thereof may represent a ratio.

Figure 5:
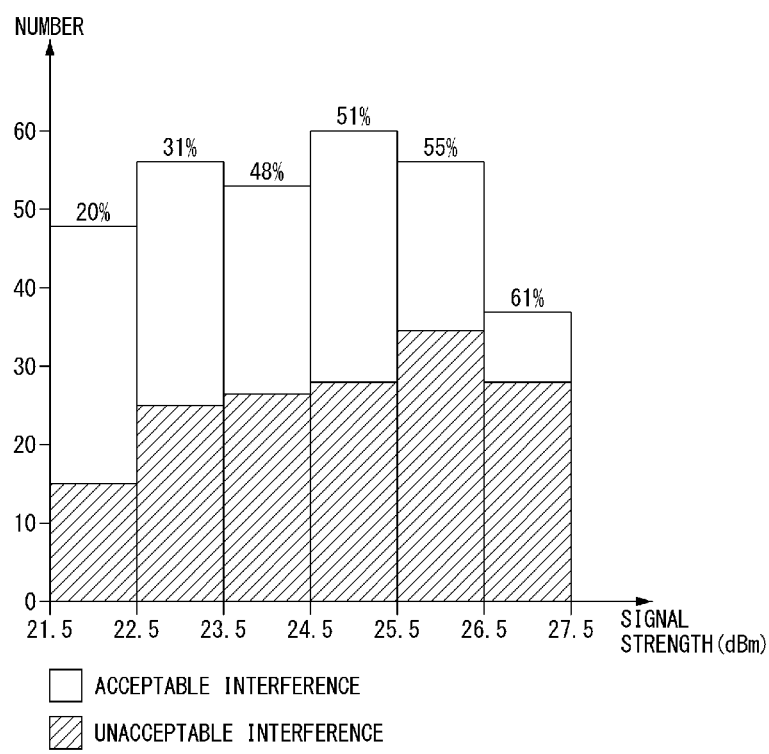
FIG. 5 is a graph illustrating a histogram of an interference occurrence ratios of RSSIs according to an embodiment.

FIG. 5 is a graph illustrating a histogram of an interference occurrence ratios of RSSIs according to an embodiment.

Referring to FIG. 5, a horizontal axis of the histogram is divided into, for example, sections with an RSSI of 1 dBm. A vertical axis of the histogram may represent the number of interference signal transmitting devices with an RSSI causing unacceptable interference and the number of interference signal transmitting devices with an RSSI causing acceptable interference in the sections. In the histogram, ratios of the interference signal transmitting devices with an RSSI causing unacceptable interference and the interference signal transmitting devices with an RSSI causing acceptable interference may be displayed at the top of rectangles.

In this case, a controller of an interference determination device may set, as a second acceptable interference level, a median of a section with a minimum ratio among sections with a ratio of 50% or more. For example, in FIG. 5, a ratio of a section greater than or equal to 21.5 dBm and less than 22.5 dBm may be 20%, a ratio of a section greater than or equal to 22.5 dBm and less than 23.5 dBm may be 31%, a ratio of a section greater than or equal to 23.5 dBm and less than 24.5 dBm may be 48%, a ratio of a section greater than or equal to 24.5 dBm and less than 25.5 dBm may be 51%, a ratio of a section greater than or equal to 25.5 dBm and less than 26.5 dBm may be 55%, and a ratio of a section greater than or equal to 26.5 dBm and less than 27.5 dBm may be 61%. In this case, the controller of the interference determination device may set, as the second acceptable interference level, a median of 25 dBm of the section with the minimum ratio, i.e., the section greater than or equal to 24.5 dBm and less than 25.5 dBm, among the sections with a ratio of 50% or less.

Figure 6:
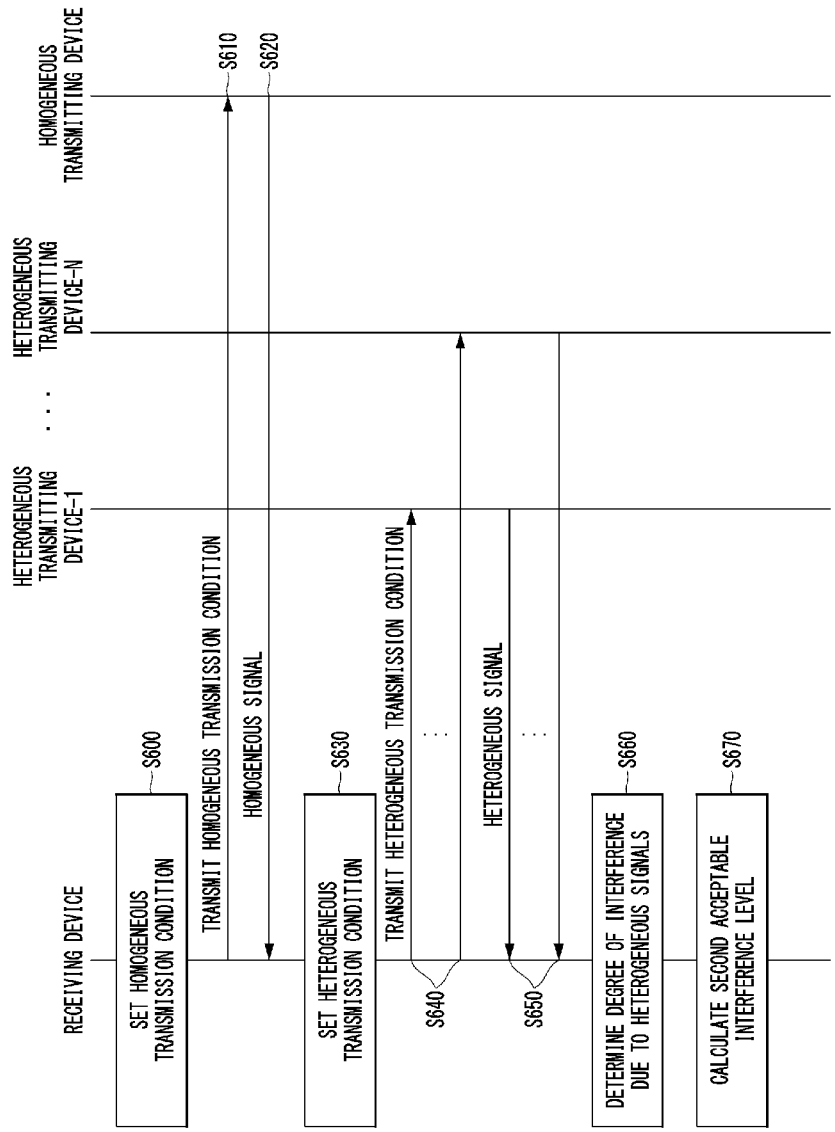
FIG. 6 is a flowchart of a process of setting a second acceptable interference level on the basis of the first acceptable interference level of FIG. 2 according to an embodiment.

FIG. 6 is a flowchart of a process of setting a second acceptable interference level on the basis of the first acceptable interference level of FIG. 2 according to an embodiment.

Referring to FIG. 6, in the process of setting the second acceptable interference level on the basis of the first acceptable interference level, a receiving device may set a homogeneous device transmission condition (S600). Here, the homogeneous device transmission condition may be set to select an arbitrary signal corresponding to each service and set the selected signal as a homogeneous signal to secure statistical diversity in determining interference between heterogeneous services by a system for determining interference between heterogeneous services.

A receiving device may transmit the set transmission condition to homogeneous transmitting devices (S610). Thus, homogeneous transmitting devices may receive the transmission condition from the receiving device. Next, the homogeneous transmitting devices may transmit the homogeneous signal to the receiving device according to the received transmission condition (S620). Here, the receiving device and the homogeneous transmitting devices may be installed at fixed positions.

Meanwhile, the receiving device may set a heterogeneous transmission condition (S630) and transmit the set heterogeneous transmission condition to heterogeneous transmitting devices (S640). Thus, the heterogeneous transmitting devices may receive the heterogeneous transmission condition from the receiving device. Next, the heterogeneous transmitting devices may transmit heterogeneous signals to the receiving device according to the heterogeneous transmission condition (S650). Accordingly, the receiving device may receive heterogeneous signals from the heterogeneous transmitting devices. Here, the heterogeneous transmission condition may include at least one of locations of sample installation points, point-specific antenna heights, point-specific antenna orientations, point-specific antenna types, gains of the point-specific antenna types, an EIRP of each of the point-specific antenna types, point-specific transmission times, heterogeneous signal characteristics, a location of the receiving device, and a center frequency of a channel for which it is desired to measure whether or not interference occurs.

In detail, the receiving device may set sample installation points and transmit location information of the set sample installation points to heterogeneous transmitting devices. In this case, the receiving device may select sample installation points variously to secure statistical parameters by reflecting various channel environments. In this case, each of the heterogeneous transmitting devices may receive the location information of a corresponding sample installation point from the receiving device. The heterogeneous transmitting devices may check current locations thereof using a GPS receiver and move to corresponding sample installation points, the location information of which is received from the receiver.

Meanwhile, the receiving device may set point-specific antenna heights and point-specific orientations for the respective sample installation points. In addition, the receiving device may transmit point-specific antenna height information and point-specific antenna orientation information, which are set for the sample installation points, to the heterogeneous transmitting devices. Thus, the heterogeneous transmitting devices may receive the point-specific antenna height information and the point-specific antenna orientation information for the sample installation points from the receiving device. In this case, the receiving device may set an antenna height to 3 m or 9 m.

In addition, the receiving device may set point-specific antenna types, gains of the point-specific antenna types, and EIRPs for the point-specific antenna types with respect to the sample installation points. In this case, the receiving device may set an omni-directional antenna or a directional antenna as an antenna type. In addition, the receiving device may set 6 dBi for the omni-directional antenna and 19.5 dBi for the directional antenna as gains of the point-specific antenna types. Next, the receiving device may set 44.5 dBm/100 MHz for the omni-directional antenna and 58 dBm/100 MHz for the directional antenna as an EIRP for a point-specific antenna type.

In addition, the receiving device may set point-specific transmission times, for the sample installation points, at which an interference signal is to be measured. In this case, the receiving device may set the point-specific transmission time, for each of the sample installation points, to a plurality of time sections. In addition, the receiving device may transmit point-specific transmission time information about the set point-specific transmission times to the heterogeneous transmitting devices. The heterogeneous transmitting devices may receive the point-specific transmission time information for the sample installation points, at which an interference signal is to be measured, from the receiving device.

In addition, the receiving device may set heterogeneous signal characteristics with respect to the sample installation points. In this case, the receiving device may set the heterogeneous signal characteristics to be converted into various types of data and transmit the various types of data for each test. In addition, the receiving device may select arbitrary signals corresponding to services as heterogeneous signals to secure statistical diversity. For example, the heterogeneous signals may be mobile communication interference signals. Here, the transmission characteristics may include at least one of transmission data, transmission frequency, and transmission power. In addition, the receiving device may transmit information about point-specific heterogeneous signal characteristics to the heterogeneous transmitting devices. Thus, the heterogeneous transmitting devices may receive the information about the point-specific heterogeneous signal characteristics for each of the sample installation points from the receiving device.

In addition, the receiving device may transmit location information thereof to the heterogeneous transmitting devices. Thus, the heterogeneous transmitting devices may receive the location information of the receiving device from the receiving device. In addition, the receiving device may transmit center frequency information of a channel for which it is desired to measure whether or not interference occurs to the heterogeneous transmitting devices. Thus, the heterogeneous transmitting devices may receive the center frequency information of the channel for which it is desired to measure whether or not interference occurs from the receiving device.

Thus, each of the heterogeneous transmitting devices may generate a heterogeneous signal corresponding to the center frequency information of the channel received from the receiving device at the corresponding sample installation point at the point-specific transmission time according to the point-specific transmission time information, and transmit the heterogeneous signal toward the receiving device. In this case, each of the heterogeneous transmitting devices may transmit the heterogeneous signal at the corresponding sample installation point at the antenna height according to the point-specific antenna height information and in an orientation according to the point-specific orientation information. In addition, each of the heterogeneous transmitting devices may select a point-specific antenna type at the corresponding sample installation point according to the point-specific antenna type information, and transmit an EIRP for the point-specific antenna type according to the EIRP information for the point-specific antenna type on the basis of the gain of the point-specific antenna type according to the gain information of the point-specific antenna type.

In this case, the heterogeneous transmitting devices may provide the receiving device with at least one of an identifier thereof, location information (e.g., GPS coordinate information), antenna height of an antenna in use, an antenna orientation of the antenna, an antenna type of the antenna, an antenna gain of the antenna, an EIRP of the antenna, and transmission time.

Here, the system for determining interference between heterogeneous services may include a plurality of heterogeneous transmitting devices to transmit a heterogeneous signal at each of the sample installation points. Alternatively, the system for determining interference between heterogeneous services may include one interference signal transmitting device, and the interference signal transmitting device may be installed in a moving device (e.g., a vehicle) to transmit a mobile communication interference signal toward the receiving device at sample installation points while moving around the receiving device.

Meanwhile, the receiving device may receive a homogeneous signal from homogeneous transmitting devices. In this case, the receiving device may receive a homogeneous signal of a corresponding channel according to a set center frequency of the channel. Meanwhile, the receiving device may receive heterogeneous signals from heterogeneous transmitting devices. In this case, the receiving device may receive the heterogeneous signals from the heterogeneous transmitting devices at appointed point-specific transmission times.

In contrast, the receiving device may receive the heterogeneous signals from the heterogeneous transmitting devices regardless of the appointed point-specific transmission times. As described above, when the receiving device receives the heterogeneous signals regardless of the appointed point-specific transmission times, the receiving device may receive identifier information, transmission point information of a mobile communication interference signal, and transmission time information from each of the heterogeneous transmitting devices. In addition, the receiving device may check sample installation points of the received heterogeneous signals by referring to the identifier information, the transmission point information of the heterogeneous signals, and the transmission time information that are received from the heterogeneous transmitting devices.

As described above, the receiving device may receive the homogeneous signal and the heterogeneous signals at the same time. Accordingly, the receiving device may receive combined signals of the homogeneous signal and the heterogeneous signals. In this case, the receiving device may check reception time information of the homogeneous signal and the heterogeneous signals by using a timer included in the receiving device. Alternatively, the receiving device may demodulate only the homogeneous signal.

Meanwhile, the receiving device may determine whether interference has occurred on the basis of the combined signals (S660). For example, the receiving device may determine that acceptable interference has occurred in a case in which a broadcast service is performed normally in the case of a broadcast. In contrast, the receiving device may determine that unacceptable interference has occurred in a case in which a broadcast service is not performed normally. Here, the case in which the broadcast service is not performed normally may be a case in which screen distortion or the like has occurred.

As another example, the receiving device may calculate packet loss rates of a broadcast signal on the basis of the combined signals. In addition, the receiving device may determine that acceptable interference has occurred when a calculated packet loss rate is, for example, 10% or less. In contrast, the receiving device may determine that unacceptable interference has occurred when the calculated packet loss rate is greater than, for example, 10%. Here, a packet loss rate of 10% may be a first acceptable interference level.

As another example, in the case of a mobile communication signal, the receiving device may determine that unacceptable interference has occurred when the packet loss rate is greater than 10%. In the case of mobile communication, it may be determined that acceptable interference has occurred when the packet loss rate is 10% or less.

As another example, in the case of mobile communication, the receiving device may determine that unacceptable interference has occurred when a required user experienced data rate or a peak data rate, which is a data rate parameter defined in the Third Generation Partnership Project (3GPP), is 95% or less. In contrast, in the case of mobile communication, the receiving device may determine that acceptable interference has occurred when the required user experienced data rate or the peak data rate, which is a data rate parameter defined in the 3GPP, is greater than 95%. Here, the above-described ratios may vary, for example, according to required service quality.

Meanwhile, the receiving device may calculate the difference between the RSSI of an identical signal before the reception of heterogeneous signals and the RSSI of a combined signal after the reception of the heterogeneous signals. The difference between the RSSIs may be the same as the difference between the RSSIs of the heterogeneous signals. Accordingly, the receiving device may identify sample installation points corresponding to combined signals by matching point-specific transmission times of interference signal generation points, which may be stored and managed, with reception times of the combined signals.

In such a situation, at least one of the heterogeneous transmitting devices may be located away from the receiving device so as to not interfere with the receiving device. Thus, at least one of the heterogeneous transmitting devices may not interfere with the receiving device. Accordingly, the number of interference signal transmission points identified by the receiving device may be less than the number of the heterogeneous transmitting devices. In this case, the receiving device may produce an interference status table as shown in Table 1 above. Here, n may be 6. The receiving device may process that there is no interference when a heterogeneous signal is not received from a heterogeneous transmitting device. In this case, the receiving device may calculate a second acceptable interference level on the basis of the RSSIs of the heterogeneous signals and interference determination results (S670).

In this case, the receiving device may calculate an RSSI as the second acceptable interference level at a boundary point at which interference has occurred, based on RSSIs of interference signals and interference determination results. Alternatively, the receiving device may draw a histogram using received RSSIs received from the interference signal transmitting devices. In this case, a horizontal axis of the histogram may represent an RSSI and a vertical axis thereof may represent a ratio.

A vertical axis of the histogram may represent the number of interference signal transmitting devices with an RSSI causing unacceptable interference and the number of interference signal transmitting devices with an RSSI causing acceptable interference in the RSSI sections. In the histogram, ratios of the interference signal transmitting devices with an RSSI causing unacceptable interference and the interference signal transmitting devices with an RSSI causing acceptable interference may be displayed at the top of rectangles. In this case, the receiving device may set, as the second acceptable interference level, a median of a section with a minimum ratio among sections with a ratio of 50% or less.

Figure 7:
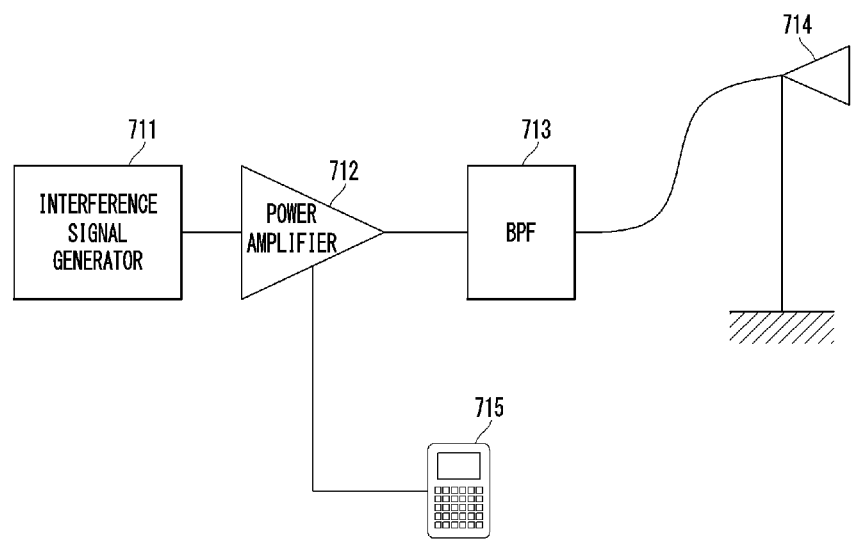
FIG. 7 is a conceptual diagram illustrating an interference signal transmitting device as shown in FIG. 3 according to an embodiment.

FIG. 7 is a conceptual diagram illustrating an interference signal transmitting device as shown in FIG. 3 according to an embodiment.

Referring to FIG. 7, the interference signal transmitting device may include an interference signal generator 711, a power amplifier 712, a band-pass filter (BPF) 713, an antenna 714, and a spectrum analyzer 715. Here, the interference signal generator 711 may check a center frequency of a satellite channel from a controller of an interference determination device and generate and output a mobile communication interference signal having the checked center frequency.

The power amplifier 712 may amplify and output the mobile communication interference signal generated by the interference signal generator 711. Then, the BPF 713 may perform band-pass filtering on the mobile communication interference signal and provide a resultant signal to the antenna 714. In this case, the BPF 713 may provide a mobile communication interference signal of 3.7 GHz to 4.0 GHz to the antenna 714. The antenna 714 may transmit the mobile communication interference signal toward a receiver of the interference determination device.

Meanwhile, the spectrum analyzer 715 may receive a mobile communication interference signal branching from the power amplifier 712 and display an amplitude and phase of a waveform of the mobile communication interference signal. Accordingly, a user may visually check a waveform of an output signal. Here, the antenna 714 may be an omni-directional antenna or a directional antenna. An antenna gain of the omni-directional antenna may be, for example, 6 dBi and an antenna gain of the directional antenna may be, for example, 19.5 dBi. A height of the antenna 714 may be 3 m or 9 m. As an EIRP for a point-specific antenna type, 44.5 dBm/100 MHz may be set when the antenna 714 is an omni-directional antenna and 58 dBm/100 MHz may be set when the antenna 714 is a directional antenna.

Figure 8:
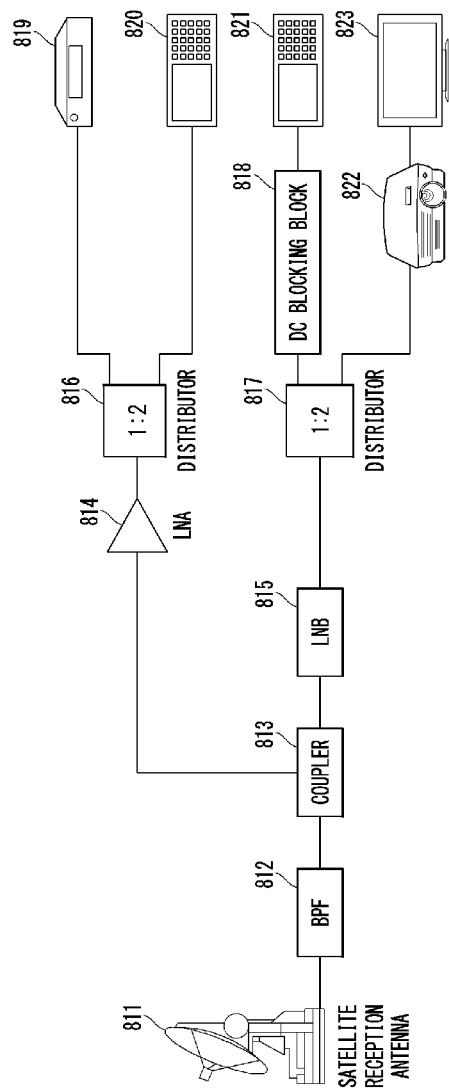
FIG. 8 is a conceptual diagram illustrating the interference determination device of FIG. 3 according to an embodiment.

FIG. 8 is a conceptual diagram illustrating the interference determination device of FIG. 3 according to an embodiment.

Referring to FIG. 8, the interference determination device may include a satellite reception antenna 811, a BPF 812, a coupler 813, a low-noise amplifier (LNA) 814, a low-noise block (LNB) down-converter 815, a first distributor 816, a second distributor 817, a direct-current (DC) blocking block 818, an interference signal demodulator 819, a first spectrum analyzer 820, a second spectrum analyzer 821, a set-top box (STB) 822, and a monitor 823.

Here, the satellite reception antenna 811 may receive and output a satellite signal. When there is an interference signal (e.g., a heterogeneous signal), the satellite reception antenna 811 may receive the satellite signal and the interference signal and output a combined signal of the satellite signal and the interference signal. The satellite reception antenna 811 may have a diameter of 3.7 m. In addition, the BPF 812 may receive signals from the satellite reception antenna 811 and pass a signal of a set band. In this case, the set band may be, for example, 3.7 GHz to 4.0 GHz.

Next, the coupler 813 may cause a signal passing through the BPF 812 to branch into the LNA 814 and the LNB down-converter 815. In this case, the LNA 814 may amplify the signal passing through the BPF 813 and output an amplified signal. Next, the first distributor 816 may receive the amplified signal from the LNA 814 and distribute the amplified signal to the interference signal demodulator 819 and the first spectrum analyzer 820.

Thus, the interference signal demodulator 819 may receive the signal distributed from the first distributor 816 and perform frequency scanning on the received signal. The interference signal demodulator 819 may detect and display a frequency, amplitude, and phase of an interference signal when the interference signal is contained in the signal received from the first distributor 816. The first spectrum analyzer 820 may receive the signal distributed from the first distributor 816 and perform spectrum analysis on the received signal.

In addition, the first spectrum analyzer 820 may detect and display the frequency, amplitude, and phase of the signal received from the first distributor 816. In this case, the first spectrum analyzer 820 may detect and display a frequency, amplitude, and phase of a combined signal of a satellite signal and an interference signal when the satellite signal and the interference signal are contained in the signal received from the first distributor 816. Accordingly, the interference determination device may identify the strength of an identical satellite signal when there is no interference signal and thus may identify a frequency, amplitude and phase of the interference signal by comparing an RSSI of the combined signal with the strength of the same satellite signal.

Meanwhile, the LNB down-converter 815 may receive the signal passing through the BPF 812 through the coupler 813, and output a frequency down-converted signal by reducing a frequency of the signal to 1.15 GHz or 1.45 GHz so that the signal may be processed by the STB 822. Next, the second distributor 817 may distribute the frequency down-converted signal from the LNB down-converter 815 to the second spectrum analyzer 821 and the STB 822. In this case, the second spectrum analyzer 821 may receive the distributed signal from the second distributor 817 and perform spectrum analysis on the received signal.

In addition, the second spectrum analyzer 821 may detect and display a frequency, amplitude, and phase of the signal received from the second distributor 817. In this case, the second spectrum analyzer 821 may detect and display a frequency, amplitude, and phase of a combined signal of a satellite signal and an interference signal when the satellite signal and the interference signal are contained in the signal received from the second distributor 817. Accordingly, the interference determination device may identify the strength of an identical satellite signal when there is no interference signal and thus may identify a frequency, amplitude and phase of the interference signal by comparing an RSSI of the combined signal with the strength of the identical satellite signal.

Meanwhile, the DC blocking block 818 may remove a DC component from a frequency down-converted signal and provide the resultant frequency down-converted signal to the second spectrum analyzer 821. Meanwhile, the STB 822 may receive the frequency down-converted signal, restore an image therefrom, and output the image through the monitor 823.

Figure 9:
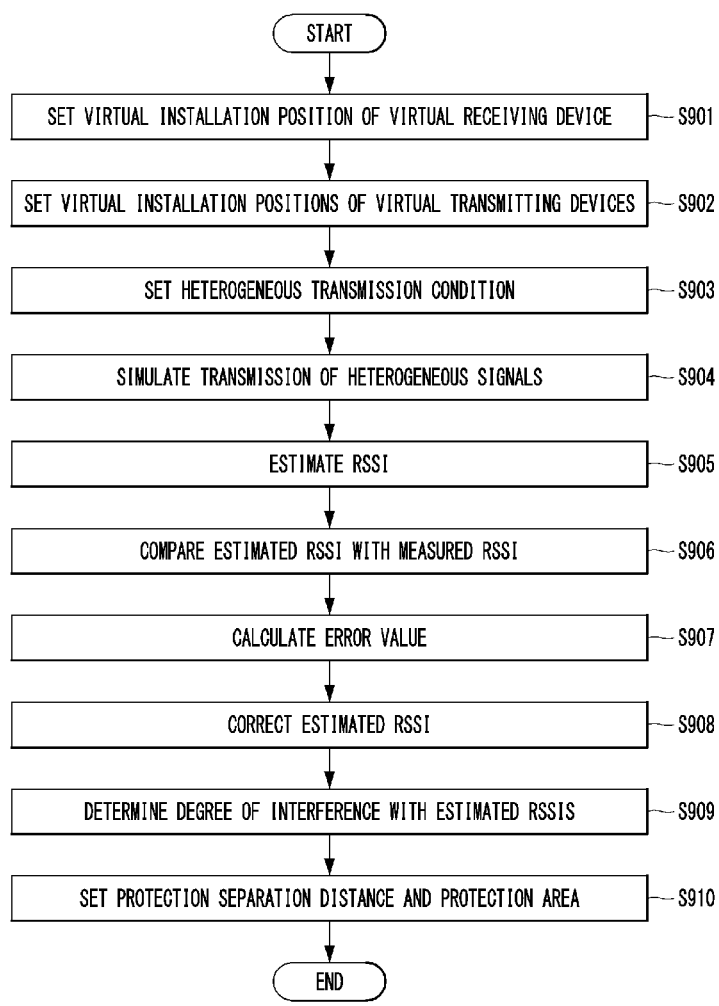
FIG. 9 is a flowchart of a process of setting a protection separation distance and a protection area using the GIS of FIG. 2 according to an embodiment.

FIG. 9 is a flowchart of a process of setting a protection separation distance and a protection area using the GIS of FIG. 2 according to an embodiment.

Referring to FIG. 9, in the process of setting a protection separation distance and a protection area using the GIS, a receiving device may virtually set an installation position of a virtual receiving device on a map provided by the GIS (S901). That is, the receiving device may set a virtual installation position of the virtual receiving device on the map provided by the GIS. Here, the GIS may be a 3D GIS.

Next, the receiving device may set installation positions of virtual heterogeneous transmitting devices on the map provided by the GIS (S902). That is, the receiving device may set virtual installation positions (i.e., virtual installation points) of the virtual heterogeneous transmitting devices on the map provided by the GIS.

Next, the receiving device may set a heterogeneous transmission condition (S903). Here, the heterogeneous transmission condition may include at least one of point-specific antenna heights, point-specific antenna orientations, point-specific antenna types, gains of the point-specific antenna types, an EIRP of each of the point-specific antenna types, point-specific transmission times, heterogeneous signal characteristics, and a center frequency of a channel for which it is desired to measure whether or not interference occurs.

Meanwhile, the receiving device may set an antenna height to 3 m or 9 m. The receiving device may set an omni-directional antenna or a directional antenna as a point-specific antenna type. The receiving device may set 6 dBi for the omni-directional antenna and 19.5 dBi for the directional antenna as gains of the point-specific antenna types. The receiving device may set 44.5 dBm/100 MHz for the omni-directional antenna and 58 dBm/100 MHz for the directional antenna as an EIRP for a point-specific antenna type.

The receiving device may set point-specific transmission times, for the installation points of the virtual heterogeneous transmitting devices, at which an interference signal is to be measured. In this case, the receiving device may set the point-specific transmission time, for each of the virtual installation points, to a plurality of time sections. In addition, the receiving device may set heterogeneous signal characteristics with respect to the virtual installation points of the virtual heterogeneous transmitting devices.

In this case, the receiving device may set the heterogeneous signal characteristics to be converted into various types of data and transmit the various types of data for each test. In addition, the receiving device may select arbitrary signals corresponding to services as heterogeneous signals to secure statistical diversity. For example, the heterogeneous signals may be mobile communication interference signals. Here, the transmission characteristics may include at least one of transmission data, transmission frequency, and transmission power. In addition, the receiving device may set center frequency information of a channel for which it is desired to measure whether or not interference occurs to be transmitted to the heterogeneous transmitting devices.

Thereafter, the receiving device may simulate the virtual heterogeneous transmitting devices to transmit virtual interference signals toward the virtual receiving device (S904). In this case, the receiving device may simulate the virtual heterogeneous transmitting devices to transmit virtual interference signals toward the virtual receiving device according to the set heterogeneous transmission condition. Next, the receiving device may estimate predicted RSSIs when the virtual receiving device receives the virtual interference signals from the virtual heterogeneous transmitting devices using a radio wave propagation algorithm, based on geographic information provided by the GIS (S905).

In this case, the GIS may provide 3D geographic information that does not completely replicate a real environment. In addition, the radio wave propagation algorithm may not completely model an actual propagation phenomenon. Accordingly, the RSSIs estimated by the receiving device may be inaccurate due to the geographic information that does not completely replicate the real environment and the radio wave propagation algorithm that does not completely model the actual propagation phenomenon.

To solve this problem, the receiving device may compare RSSIs measured at sample installation points during setting of a second acceptable interference level based on the first acceptable interference level of FIG. 6 with RSSIs estimated at the virtual installation positions of the virtual heterogeneous transmitting devices corresponding to the sample installation points (S906).

In addition, when the RSSIs measured at the sample installation points are different from the RSSIs estimated at the virtual installation positions, the receiving device may calculate the difference, i.e., an error value, between the measured RSSIs and the estimated RSSIs (S907). Thereafter, the receiving device may correct the estimated RSSIs to be same as the measured RSSIs by reflecting the calculated error value (S908).

In this case, the number of virtual installation points set by the receiving device may be significantly greater than the number of sample installation points. Accordingly, some of the virtual installation points may not have corresponding sample installation points. In this way, the receiving device may calculate an interpolation error value by spatially interpolating error values between estimated RSSIs of virtual installation points that do not correspond to any sample installation points and RSSIs of virtual installation points that correspond to sample installation points adjacent thereto. In addition, the receiving device may correct the estimated RSSIs by subtracting the interpolation error value from or adding the interpolation error value to the estimated RSSIs.

In this case, the receiving device may determine a degree of interference with the corrected estimated RSSIs on the basis of the second acceptable interference level (S909). In this case, the receiving device may determine that acceptable interference has occurred when the estimated RSSIs are less than the second acceptable interference level. In contrast, the receiving device may determine that unacceptable interference has occurred when the estimated RSSIs are greater than or equal to the second acceptable interference level.

The receiving device may set a protection separation distance and a protection area on the basis of a result of determining the degree of interference (S910). Here, the protection separation distance may be a radius of a circle in which the number of virtual heterogeneous transmitting devices causing acceptable interference is greater than or equal to a certain value, when concentric circles are set based on the virtual receiving devices. Here, the protection area may be a partial area in which virtual heterogeneous transmitting devices, which are located a relatively long distance from the circle with the radius equal to the protection separation distance and which cause unacceptable interference, are clustered.

Figure 10:
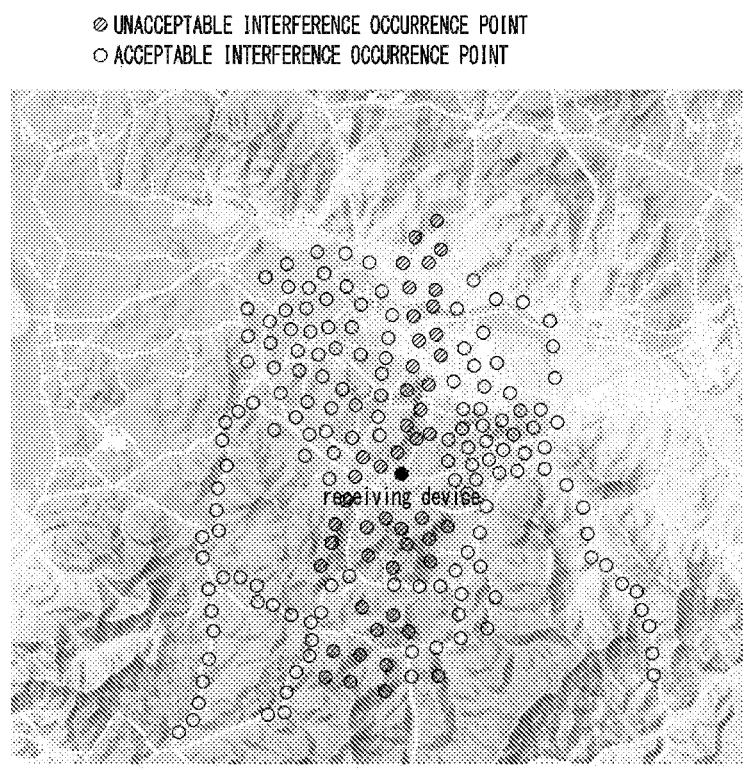
FIG. 10 is a conceptual diagram illustrating degrees of interference due to heterogeneous transmitting devices on a map according to an embodiment.

FIG. 10 is a conceptual diagram illustrating degrees of interference due to heterogeneous transmitting devices on a map according to an embodiment.

Referring to FIG. 10, virtual heterogeneous transmitting devices may cause unacceptable interference when they are close to a virtual receiving device. In contrast, the virtual heterogeneous transmitting devices may cause acceptable interference when they are further away from the virtual receiving device. However, even when the virtual heterogeneous transmitting devices are further away from the virtual receiving device, the virtual heterogeneous transmitting devices may cause unacceptable interference at a geographically high area or when there is a structure that propagates radio waves near the virtual heterogeneous transmitting devices and the virtual receiving device.

Figure 11:
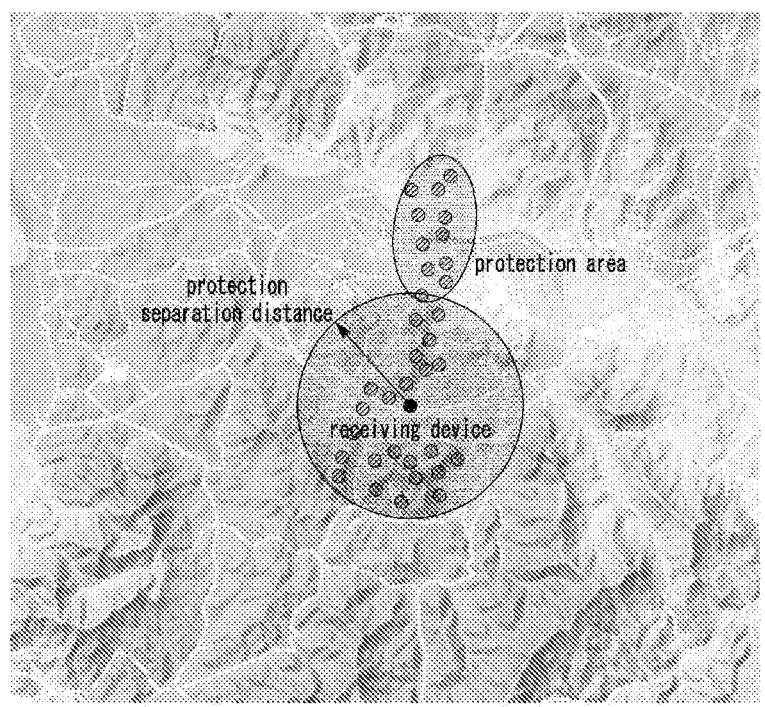
FIG. 11 is a conceptual diagram illustrating a protection separation distance and a protection area displayed on a map according to an embodiment.

FIG. 11 is a conceptual diagram illustrating a protection separation distance and a protection area displayed on a map according to an embodiment.

Referring to FIG. 11, a receiving device may set a protection separation distance and a protection area on the basis of a result of determining a degree of interference. Here, the protection separation distance may be a radius of a circle in which the number of virtual heterogeneous transmitting devices causing acceptable interference is greater than or equal to a certain value, when concentric circles are set based on the virtual receiving devices. Here, the protection area may be a partial area in which virtual heterogeneous transmitting devices, which are located a relatively long distance from the circle with the radius equal to the protection separation distance and which cause unacceptable interference, are clustered.

Figure 12:
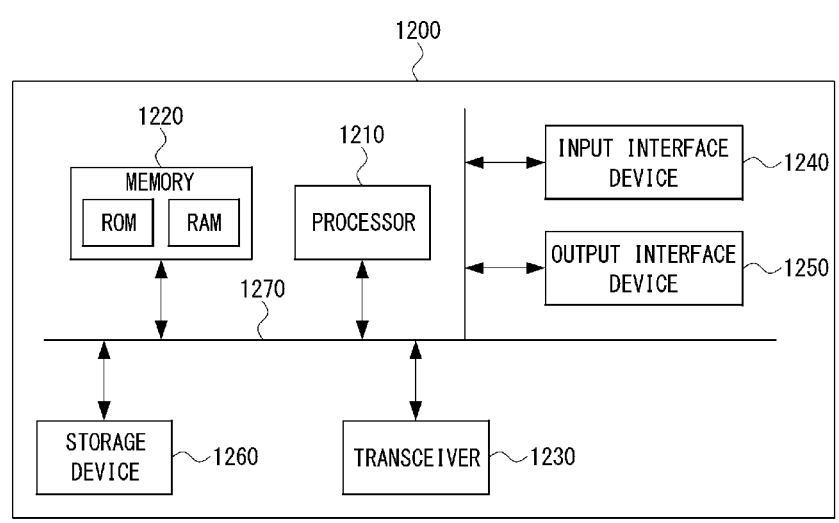
FIG. 12 is a block diagram illustrating of an interference determination device of a system for determining interference between heterogeneous services according to an embodiment.

FIG. 12 is a block diagram illustrating of an interference determination device of a system for determining interference between heterogeneous services according to an embodiment.

Referring to FIG. 12, an interference determination device 1200 may include at least one processor 1210, a memory 1220, and a transceiver 1230 connected to a network to perform communication. The interference determination device 1200 may further include an input interface device 1240, an output interface device 1250, a storage device 1260, and the like. The components of the interference determination device 1200 may be connected to one another by a bus 1270 to communicate with one another. However, each of the components of the interference determination device 1200 may be connected with each other through the processor 1210 using an individual interface or an individual bus rather than the bus 1270 which is a common bus. For example, the processor 1210 may be connected to at least one of the memory 1220, the transceiver 1230, the input interface device 1240, the output interface device 1250, and the storage device 1260 through a dedicated interface.

The processor 1210 may execute a program command stored in at least one of the memory 1220 and the storage device 1260. The processor 1210 may be understood as a central processing unit (CPU), a graphics processing unit (GPU), or a dedicated processor configured to perform methods according to embodiments of the present disclosure. Each of the memory 1220 and the storage device 1260 may be configured as at least one of a volatile storage medium and a nonvolatile storage medium. For example, the memory 1220 may be configured as at least one of a read-only memory (ROM) and a random access memory (RAM).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operating method of a receiving device for a satellite broadcast communication network of a communication system, comprising:
   receiving a satellite broadcast signal from a transmitting device for the satellite broadcast communication network;
   receiving interference signals from transmitting devices for a mobile communication network installed at sample installation points in a base station installation target area; and
   setting a threshold for interference level for classifying virtual interference signals on the basis of received signal strength indicators (RSSIs) of the interference signals.

2. The operating method of claim 1, wherein the setting of the threshold for interference level for classifying virtual interference signals on the basis of the RSSIs of the interference signals comprises:
   measuring RSSIs of the interference signals;
   determining a degree of interference with the interference signals affecting on the satellite broadcast signal;
   classifying interference signals causing unacceptable interference; and
   setting the threshold for interference level for classifying virtual interference signals on the basis of the RSSIs of the interference signals causing unacceptable interference.

3. The operating method of claim 2, wherein the determining of the degree of interference with the interference signals affecting on the satellite broadcast signal comprises:
   calculating a packet loss rate of a same signal affected by each of the interference signals;
   when the packet loss rate is less than a reference level, determining that an interference signal with the packet loss rate less than the reference level is an acceptable interference signal; and
   when the packet loss rate is greater than or equal to the reference level, determining that an interference signal with the packet loss rate greater than or equal to the reference level is an unacceptable interference signal.

4. The operating method of claim 2, wherein the setting of the threshold for interference level on the basis of the RSSIs of the interference signals causing unacceptable interference comprises:
   detecting a minimum RSSI among the RSSIs of the interference signals causing unacceptable interference; and
   setting the detected minimum RSSI as the threshold for interference level.

5. The operating method of claim 2, wherein the setting of the threshold for interference level on the basis of the RSSIs of the interference signals causing unacceptable interference comprises:
   producing a histogram representing a number of transmitting devices for the mobile communication network for each of sections of the RSSIs of the interference signals;
   calculating ratios between a number of the transmitting devices for the mobile communication network causing unacceptable interference and a number of the transmitting devices for the mobile communication network causing acceptable interference in the sections; and
   setting, as the threshold for interference level, a median of a section with a minimum ratio among sections with ratios greater than or equal to a certain level.

6. The operating method of claim 1, further comprising:
   installing a virtual receiving device for the satellite broadcast communication network and virtual transmitting devices for the mobile communication network on virtual installation points on a map of a geographic information system;
   simulating the virtual receiving device for the satellite broadcast communication network to receive virtual interference signals from the virtual transmitting devices for the mobile communication network; and
   setting a protection separation distance on the basis of RSSIs of the virtual interference signals.

7. The operating method of claim 6, wherein the installing of the virtual receiving device for the satellite broadcast communication network and the virtual transmitting devices for the mobile communication network on the map of the geographic information system comprises:
   virtually installing the virtual receiving device for the satellite broadcast communication network on the map of the geographic information system;
   setting the virtual installation points on the map of the geographic information system; and
   virtually installing the virtual transmitting devices for the mobile communication network at the virtual installation points.

8. The operating method of claim 6, wherein the setting of the protection separation distance on the basis of the RSSIs of the virtual interference signals comprises:
   estimating RSSIs of the virtual interference signals received virtually by the virtual receiving device for the satellite broadcast communication network;
   classifying virtual interference signals causing unacceptable interference on the basis of the threshold for interference level; and
   setting a protection separation distance on the basis of the RSSIs of the classified virtual interference signals.

9. The operating method of claim 8, further comprising, after the estimating of the RSSIs of the virtual interference signals received virtually by the virtual receiving device for the satellite broadcast communication network:
   searching for to retrieve virtual installation points corresponding to the sample installation points;
   calculating error values between RSSIs of virtual interference signals at the retrieved virtual installation points and RSSIs actually measured at the sample installation points corresponding to the retrieved virtual installation points; and
   correcting the RSSI of each of the virtual interference signals by reflecting the calculated error values.

10. The operating method of claim 6, further comprising setting, as a protection area, a region of an area, which is not within the protection separation distance and in which virtual transmitting devices for the mobile communication network causing unacceptable interference are clustered, on the basis of the RSSIs of the virtual interference signals.

11. A receiving device for a satellite broadcast communication network comprising:
a processor;
the processor being configured to control the receiving device for the satellite broadcast communication network to:
receive a satellite broadcast signal from a transmitting device for the satellite broadcast communication network;
receive interference signals from transmitting devices for a mobile communication network installed at sample installation points in a base station installation target area; and
set a threshold for interference level for classifying virtual interference signals on the basis of received signal strength indicators (RSSIs) of the interference signals.

12. The receiving device for the satellite broadcast communication network of claim 11, wherein, when the threshold for interference level for classifying virtual interference signals is set on the basis of the RSSIs of the interference signals, the processor is further configured to control the receiving device for the satellite broadcast communication network to:

measure the RSSIs of the interference signals;
determine a degree of interference with the interference signals affecting on the satellite broadcast signal;
classify interference signals causing unacceptable interference; and
set the threshold for interference level for classifying virtual interference signals on the basis of the RSSIs of the interference signals causing unacceptable interference.

13. The receiving device for the satellite broadcast communication network of claim 11, wherein the processor is further configured to control the receiving device for the satellite broadcast communication network to:
install a virtual receiving device for the satellite broadcast communication network and virtual transmitting devices for the mobile communication network at virtual installation points on a map of a geographic information system;
simulate the virtual receiving device for the satellite broadcast communication network to receive virtual interference signals from the virtual transmitting devices for the mobile communication network; and
set a protection separation distance on the basis of the RSSIs of the virtual interference signals.

* * * * *